US010119768B2

(12) United States Patent
Tomita et al.

(10) Patent No.: US 10,119,768 B2
(45) Date of Patent: Nov. 6, 2018

(54) HEAT STORAGE DEVICE AND HEAT STORAGE MODULE INCLUDING THE SAME

(71) Applicant: Panasonic Intellectual Property Management Co., Ltd., Osaka (JP)

(72) Inventors: Hironori Tomita, Nara (JP); Toyoji Gushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 679 days.

(21) Appl. No.: 14/690,427

(22) Filed: Apr. 19, 2015

(65) Prior Publication Data

US 2015/0226494 A1 Aug. 13, 2015

Related U.S. Application Data

(63) Continuation of application No. PCT/JP2014/002829, filed on May 28, 2014.

(30) Foreign Application Priority Data

Aug. 29, 2013 (JP) ................................. 2013-177948

(51) Int. Cl.
*F28D 20/02* (2006.01)
*F28D 20/00* (2006.01)
*F28D 21/00* (2006.01)

(52) U.S. Cl.
CPC .... *F28D 20/021* (2013.01); *F28D 2020/0021* (2013.01); *F28D 2021/008* (2013.01); *Y02E 60/145* (2013.01)

(58) Field of Classification Search
CPC ........... F28D 20/021; F28D 2020/0021; F28D 2021/008; Y02E 60/145

(Continued)

(56) References Cited

U.S. PATENT DOCUMENTS 4,993,481 A * 2/1991 Kamimoto ............. F28D 20/02
165/10
7,823,286 B2 * 11/2010 Hsu ....................... F28D 15/046
165/104.26

(Continued)

FOREIGN PATENT DOCUMENTS

| JP | 7-331233 | | 12/1995 |
|---|---|---|---|
| JP | 2005257244 A | * | 9/2005 |
| JP | 2013-087276 | | 5/2013 |

OTHER PUBLICATIONS

International Search Report of PCT application No. PCT/JP2014/002829 dated Aug. 19, 2014.

*Primary Examiner* — Leonard R Leo
(74) *Attorney, Agent, or Firm* — McDermott Will & Emery LLP

(57) ABSTRACT

A heat storage device includes: a heat storage material that absorbs or release latent heat with a phase transition between a liquid phase and a solid phase; and a heat conduction member that includes a contact surface contacting the heat storage material. The heat conduction member has a thermal conductivity higher than a thermal conductivity of the heat storage material. The contact surface includes an upstream region and a downstream region that is located at downstream side of the upstream region in a flowing direction of a heat medium. A wettability of the contact surface with respect to the heat storage material is higher in the downstream region than in the upstream region.

20 Claims, 12 Drawing Sheets

(58) Field of Classification Search
USPC .................. 165/10, 133, 146, 147, 104.26
See application file for complete search history.

(56) References Cited

U.S. PATENT DOCUMENTS

| | | | |
|---|---|---|---|
| 8,631,855 B2 * | 1/2014 | Maxik ................. | H01L 23/4275 |
| | | | 165/10 |
| 8,811,014 B2 * | 8/2014 | Chauhan ............... | H01L 23/427 |
| | | | 165/104.26 |
| 2012/0168111 A1 * | 7/2012 | Soukhojak ............ | F28D 15/043 |
| | | | 165/10 |
| 2014/0174701 A1 * | 6/2014 | Kare ....................... | F28D 15/04 |
| | | | 165/104.26 |

* cited by examiner

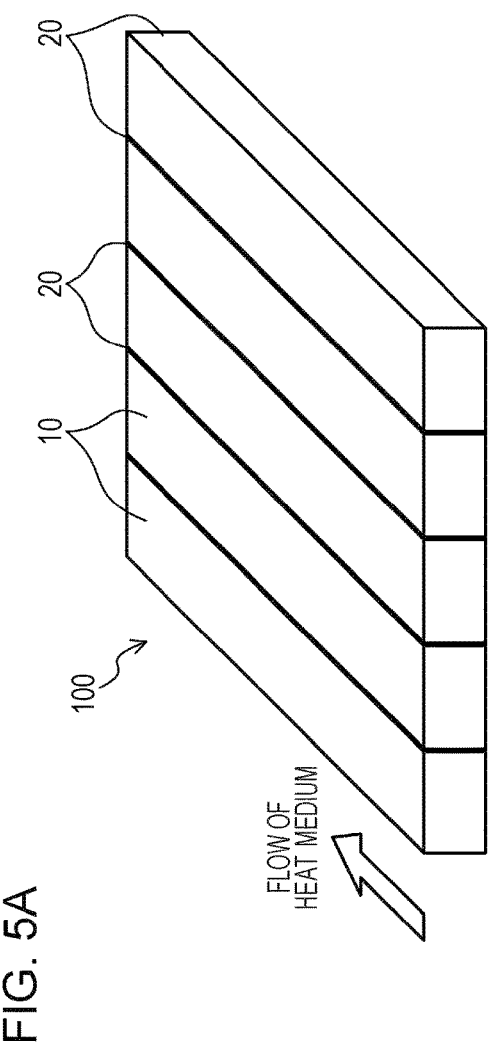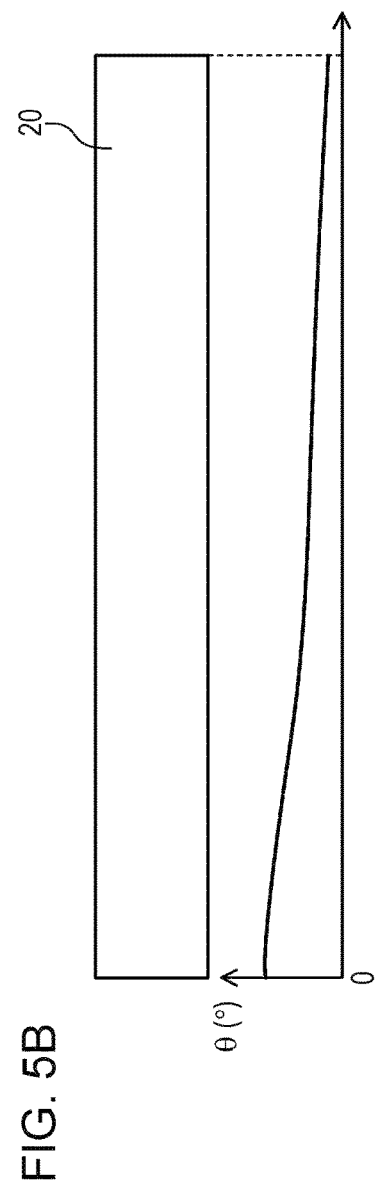
FIG. 5A
FIG. 5B

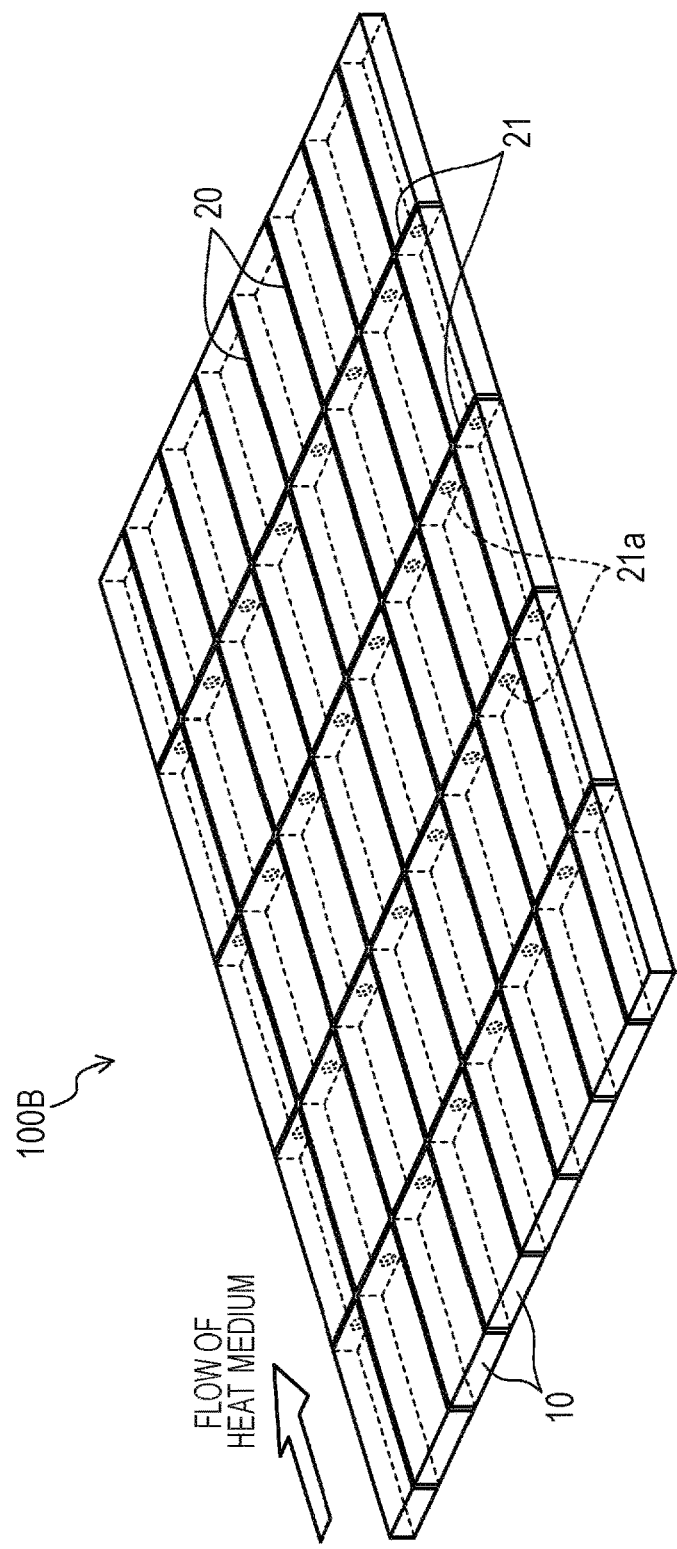

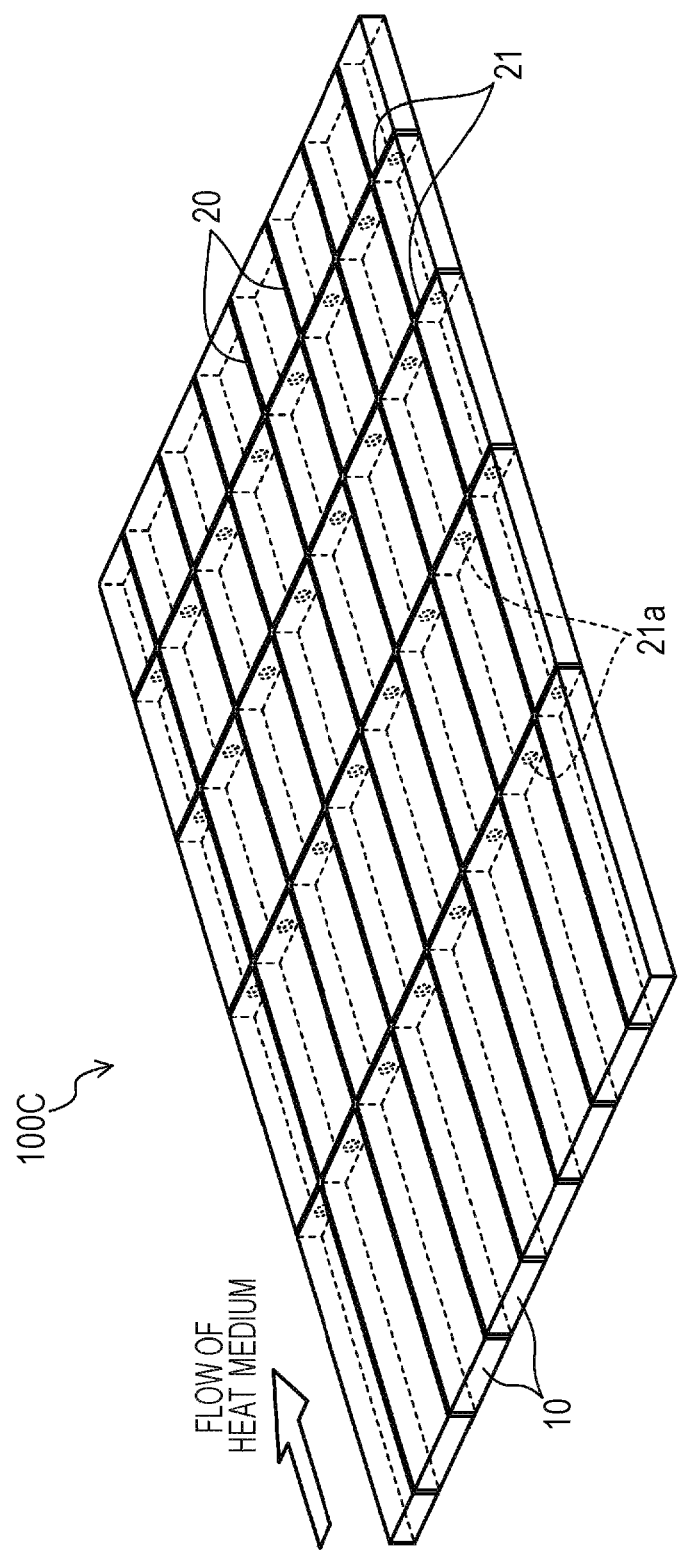

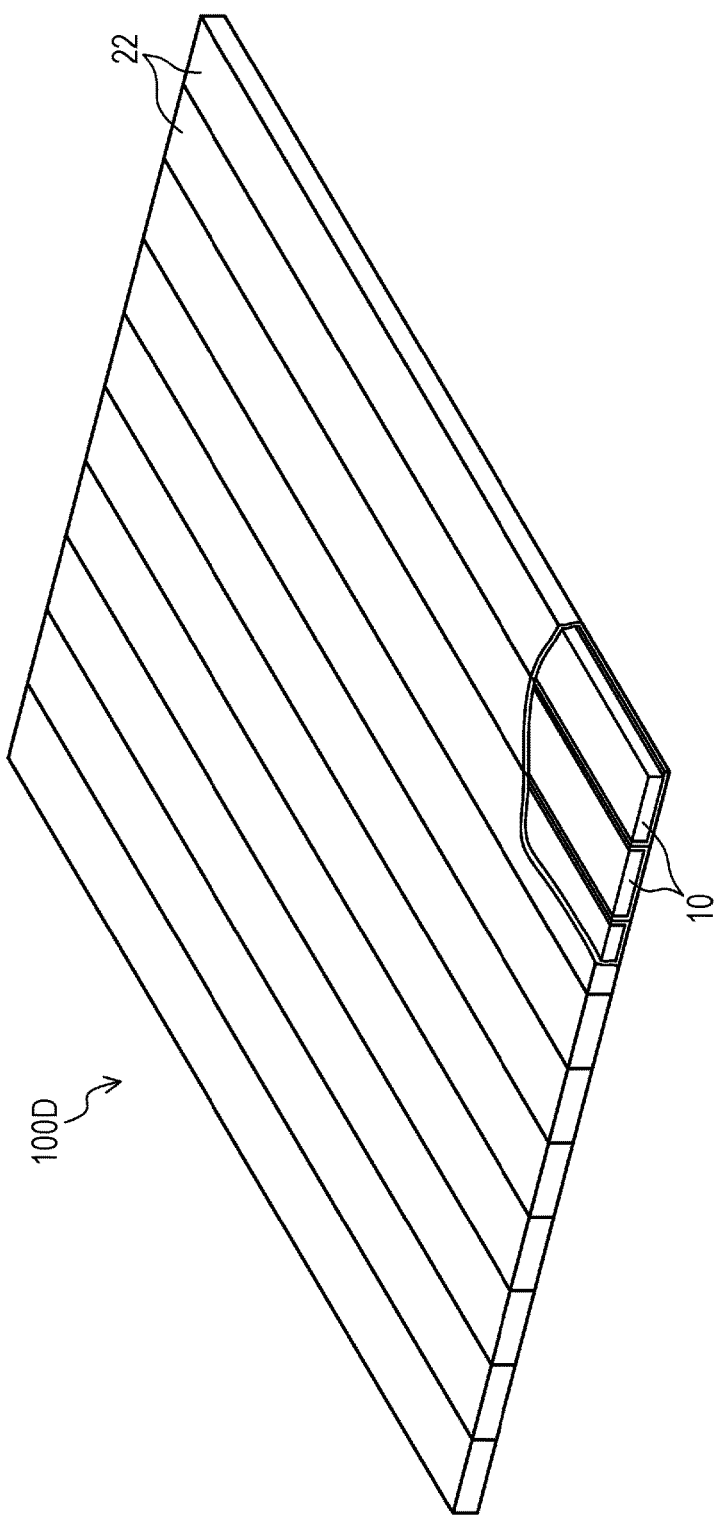

HEAT STORAGE DEVICE AND HEAT STORAGE MODULE INCLUDING THE SAME

BACKGROUND

1. Technical Field

The present disclosure relates to a heat storage device and a heat storage module including the heat storage device.

2. Description of the Related Art

An example of a heat storage device includes a heat storage material including a heat storage medium and a metal heat conduction material mixed with the heat storage medium. The heat storage medium is made of a salt hydrate that undergoes a reversible phase transition between a gel phase with high hydration and a crystal phase with low hydration, the reversible phase transition involving release or absorption of latent heat (see, for example, Japanese Unexamined Patent Application Publication No. 07-331233).

SUMMARY

One non-limiting and exemplary embodiment provides a heat storage device having a high radiation performance, and a heat storage module including the heat storage device and having a high radiation performance.

In one aspect of the present disclosure, a heat storage device, for use by being immersed in a heat medium that flows from upstream to downstream, comprises: a heat storage material that absorbs or release latent heat with a phase transition between a liquid phase and a solid phase; and a heat conduction member that includes a contact surface contacting the heat storage material, the heat conduction member having a thermal conductivity higher than a thermal conductivity of the heat storage material, the contact surface including an upstream region and a downstream region that is located at downstream side of the upstream region in the flowing direction, a wettability of the contact surface with respect to the heat storage material being higher in the downstream region than in the upstream region.

According to the aspect of the present disclosure, radiation performance of the heat storage device can be improved. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a schematic perspective view illustrating the relationship between the heat storage unit according to the first embodiment and the flow of the heat medium;

FIG. 5B illustrates a side view of the heat conduction members illustrated in FIG. 5A and the relationship between the wetting angle of the heat conduction members and the position in the direction in which the heat medium flows;

FIG. 9 is a perspective view of a heat storage unit according to a second embodiment;

FIG. 10 is a perspective view of a heat storage unit according to a modification of the second embodiment;

FIG. 11 is a perspective view of a heat storage unit according to a third embodiment;

DETAILED DESCRIPTION

Figure 1:
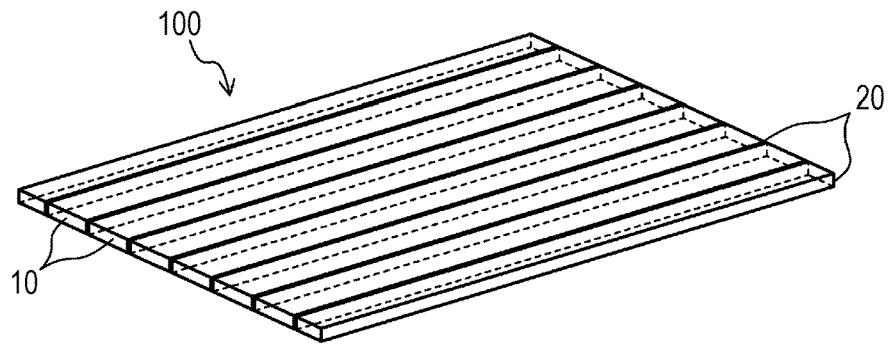
FIG. 1 is a perspective view of a heat storage unit according to a first embodiment.

A heat storage unit according to an aspect of the present disclosure, which is immersed in a heat medium that flows from upstream to downstream, may include a heat storage material that undergoes a reversible phase transition between a liquid phase and a solid phase, the reversible phase transition involving release or absorption of latent heat; and a heat conduction member arranged so as to be in contact with the heat storage material and having a contact surface that is in contact with the heat storage material, a wettability of the contact surface with respect to the heat storage material being higher in a downstream region than in an upstream region in a direction in which the heat medium flows, the heat conduction member having a thermal conductivity higher than a thermal conductivity of the heat storage material.

In the heat storage unit according to the aspect of the present disclosure, a length of the heat conduction member in the direction in which the heat medium flows may be greater than a length of the heat conduction member in a direction perpendicular to the direction in which the heat medium flows.

In the heat storage unit according to the aspect of the present disclosure, the heat storage material may be plate-shaped, and the heat conduction member may be arranged in a direction perpendicular to a plane of the heat storage material.

The heat storage unit according to the aspect of the present disclosure, may further include a sealing member that seals the heat storage material.

In this case, the heat conduction member may be fixed in the sealing member.

The heat conduction member may be thermally coupled to the sealing member at both ends of the heat conduction member in a direction perpendicular to the direction in which the heat medium flows, and include a pair of contact surfaces that oppose each other in a region between the ends and that are in contact with the heat storage material.

The sealing member may be integrated with the heat conduction member.

The sealing member may be made of a metal, graphite, or a ceramic material.

In the heat storage unit according to the aspect of the present disclosure, the wettability of the contact surface with respect to the heat storage material may be higher in a central region than in end regions of the contact surface in a short-side direction.

In the heat storage unit according to the aspect of the present disclosure, the wettability of the contact surface with respect to the heat storage material may be higher in a direction perpendicular to the direction in which the heat medium flows than in the direction in which the heat medium flows.

In the heat storage unit according to the aspect of the present disclosure, the heat storage unit may include a plurality of sub-units arranged next to each other, and each of the sub-units may include the heat storage material and the heat conduction member that seals the heat storage material.

In the heat storage unit according to the aspect of the present disclosure, the heat conduction member may be made of a metal, graphite, or a ceramic material.

In the heat storage unit according to the aspect of the present disclosure, at least a part of the contact surface of the heat conduction member may be subjected to a process for forming nanostructures, a surface treatment based on plasma treatment or oxidation, or a surface treatment for fixing a resin material to the contact surface.

The heat storage unit according to the aspect of the present disclosure may further include at least one partitioning plate that is made of a material having a thermal conductivity higher than the thermal conductivity of the heat storage material, and extends in a direction that crosses the direction in which the heat medium flows, and the heat storage material may be divided by the partitioning plate.

In this case, the partitioning plate may have an opening.

A plurality of the partitioning plates may be provided, and a gap between the partitioning plates may be smaller in the downstream region than in the upstream region in the direction in which the heat medium flows. Each of sections into which the heat storage material is divided by the partitioning plates may be smaller in the downstream region than in the upstream region in the direction in which the heat medium flows.

A heat storage module according to an aspect of the present disclosure includes any of the above-described heat storage units, and a housing that contains the heat storage unit. The housing may have an inlet and an outlet, the heat medium flowing into the housing through the inlet and flowing out of the housing through the outlet. In this case, a plurality of the heat storage units may be stacked with a gap or gaps therebetween in the housing.

A heat storage unit according to another aspect of the present disclosure is immersed in a heat medium that flows from upstream to downstream and includes a heat storage material that undergoes a reversible phase transition between a liquid phase and a solid phase, the reversible phase transition involving release or absorption of latent heat; and a heat conduction member arranged so as to be in contact with the heat storage material and having a contact surface that is in contact with the heat storage material, a wettability of the contact surface with respect to the heat storage material being higher in a central region than in end regions of the contact surface in a short-side direction, the heat conduction member having a thermal conductivity higher than a thermal conductivity of the heat storage material.

A heat storage unit according to another aspect of the present disclosure is immersed in a heat medium that flows from upstream to downstream and includes a heat storage material that undergoes a reversible phase transition between a liquid phase and a solid phase, the reversible phase transition involving release or absorption of latent heat; and a heat conduction member arranged so as to be in contact with the heat storage material and having a contact surface that is in contact with the heat storage material, a wettability of the contact surface with respect to the heat storage material being higher in a direction perpendicular to the direction in which the heat medium flows than in the direction in which the heat medium flows, the heat conduction member having a thermal conductivity higher than a thermal conductivity of the heat storage material.

First Embodiment

[Overall Structure of Heat Storage Unit 100]

A heat storage unit 100 according to a first embodiment will be described with reference to FIG. 1.

As illustrated in FIG. 1, the heat storage unit 100 according to the present embodiment includes a plate-shaped heat storage material 10 and a plurality of plate-shaped heat conduction members 20. The heat conduction members 20 divide the heat storage material 10 into a plurality of plate-shaped sections. Each heat conduction member 20 is arranged to be in contact with side surfaces of sections of the heat storage material 10. The heat storage material 10 is a material that undergoes a reversible phase transition between a liquid phase and a solid phase, the reversible phase transition involving release or absorption of latent heat. The heat storage material 10 may be, for example, a hydrate of sodium acetate, sodium sulfate, or sodium thiosulfate. The liquid phase includes a gel phase with high hydration, and the solid phase includes a crystal phase with low hydration.

The material of the heat conduction members 20 is not limited as long as the thermal conductivity thereof is higher than that of the heat storage material 10. The material of the heat conduction members 20 may be, for example, iron, aluminum, a stainless steel, copper, graphite, or a ceramic material.

Figure 2:
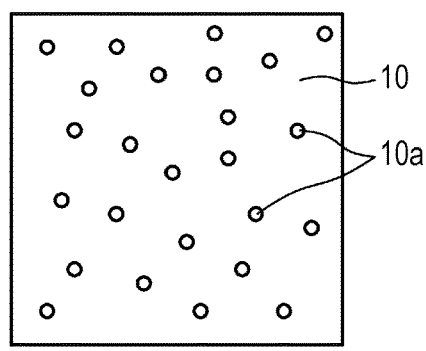
FIG. 2 is a schematic plan view illustrating nuclei generated in a supercooled heat storage material included in a heat storage unit according to a comparative example.

FIG. 2 is a schematic plan view of a heat storage unit according to a comparative example. The heat storage material 10 in a supercooled liquid state undergoes a phase transition to a solid phase in response to, for example, a mechanical vibration or a rapid temperature change. With the phase transition, solid-phase nuclei 10a are generated in the heat storage material 10.

Figure 3:
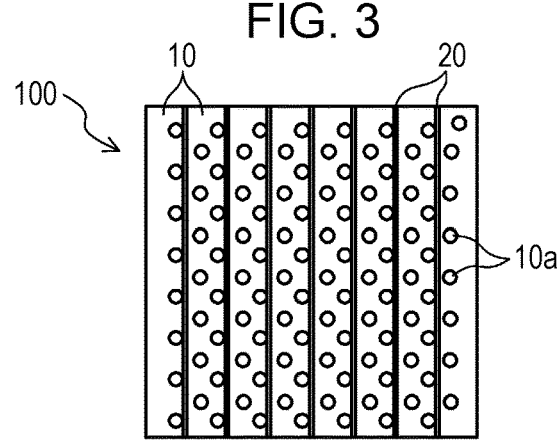
FIG. 3 is a schematic plan view illustrating nuclei generated in a supercooled heat storage material included in the heat storage unit according to the first embodiment.

FIG. 3 is a schematic plan view of the heat storage unit 100 according to the present embodiment. As illustrated in FIG. 3, the heat storage unit 100 according to the present embodiment includes the heat conduction members 20 that are in contact with the heat storage material 10. Contact surfaces of the heat conduction members 20 have a high wettability with respect to the heat storage material 10, the contact surfaces being in contact with the heat storage material 10. Therefore, the generation frequency, or occurrence, of the solid-phase nuclei 10a with the phase transition can be increased. As a result, the heat storage material 10 more easily solidifies, and thereby the radiation performance of the heat storage unit 100 can be increased. In the case where the wettability of the contact surfaces of the heat conduction members 20 is uniform, the heat storage material 10 may solidify uniformly over the entire region thereof.

The heat storage unit 100 is sealed by, for example, a sealing member, which will be described below, and is immersed in a heat medium. In this case, the heat conduction members 20 may be fixed in the sealing member. Each heat conduction member 20 is thermally coupled to the sealing member at both ends thereof in a direction perpendicular to a direction in which the heat medium flows. Each heat conduction member 20 includes a pair of contact surfaces that oppose each other in a region between the ends thereof and that are in contact with the heat storage material 10. When, for example, each heat conduction member 20 is a plate-shaped member that has upper and lower side surfaces extending in the thickness direction of the heat storage unit 100 and a pair of principal surface, the upper and lower side surfaces may be thermally coupled to the sealing member, and the pair of principal surfaces may have contact surfaces that are in contact with the sections, which are adjacent to the heat conduction member 20, of the heat storage material 10. Each heat conduction member 20 is arranged so that the length thereof in the direction in which the heat medium flows is greater than a length thereof in a direction perpendicular to the direction in which the heat medium flows.

[First Example Regarding Wettability of Heat Conduction Members 20]

A first example regarding the wettability of the heat conduction members 20 will be described with reference to FIGS. 4A and 4B.

Figure 4A:
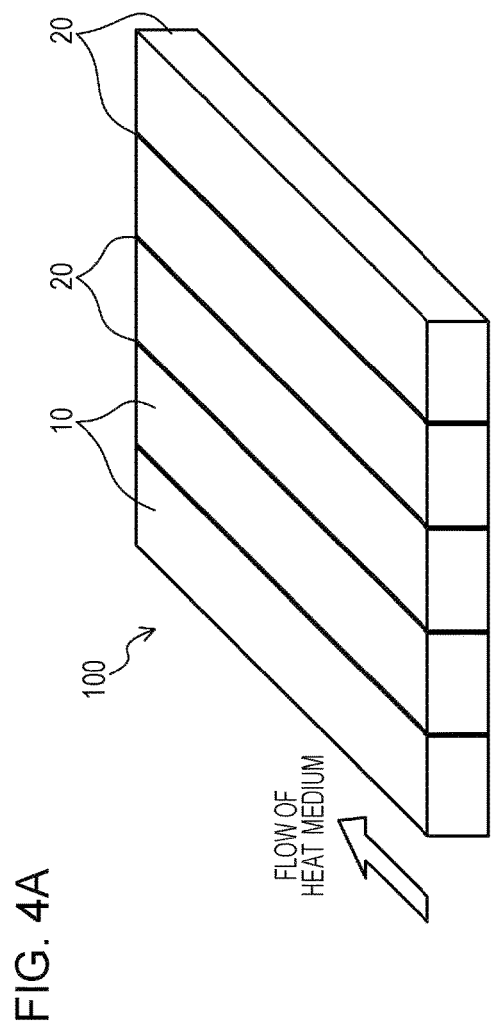
FIG. 4A is a schematic perspective view illustrating the relationship between a heat storage unit according to the first embodiment and flow of a heat medium.

FIG. 4A illustrates the direction in which the heat medium flows with respect to the heat storage unit 100. FIG. 4A illustrates the manner in which the heat medium flows in the longitudinal direction of the plate-shaped sections into which the heat storage material 10 is divided by the heat conduction members 20. The heat medium may be a liquid to be heated. In this case, the amount of heat transferred from upper and lower parts of the heat storage material 10 to the heat medium is greater than the amount of heat transferred from a central part of the heat storage material 10 to the heat medium. In other words, the amount of heat radiated from the central part of the heat storage material 10 is smaller than the amount of heat radiated from the upper and lower parts of the heat storage material 10. Thus, heat cannot be easily transferred from the central part of the heat storage material 10 to the heat medium. This is because the latent heat released from the upper and lower parts of the heat storage material 10 creates a temperature gradient that suppresses transfer of heat from the central part of the heat storage material 10 to the outside.

In the heat storage unit 100, the heat conduction members 20 are arranged in contact with the heat storage material 10 to facilitate transfer of heat from the central part of the heat storage material 10 to the heat medium.

In the first example, not only can the above-described effects be achieved by the heat conduction members 20, but the radiation performance of the heat storage unit 100 can be further increased owing to the characteristics described below. In this disclosure, the term "wettability of heat conduction members" means, unless otherwise described, the wettability of contact surfaces of the heat conduction members with respect to the heat storage material, the contact surfaces of the heat conduction members being in contact with the heat storage material. As shown in the side view of FIG. 4B, the wettability of each of the contact surfaces of the plate-shaped heat conduction members 20, which are in contact with the heat storage material 10, with respect to the heat storage material 10 is higher in a central region 20b than in an upper end region 20a and a lower end region 20a of the contact surfaces in a direction perpendicular of the longitudinal direction. The wettability of each heat conduction member 20 increases as the wetting angle θ (°), which is the contact angle between the heat conduction member 20 and the heat storage material 10, decreases.

In this case, the generation frequency of the solid-phase nuclei 10a in the heat storage material 10 is higher in a region near the central region 20b of each of the contact surfaces of the heat conduction members 20 than in regions near the upper end region 20a and the lower end region 20a of each of the contact surfaces of the heat conduction members 20. Specifically, in the initial stage of solidification, the heat storage material 10 is more easily solidified in the central region, and thereby the central region thereof release the latent heat. Owing to the latent heat, a temperature gradient that facilitates transfer of heat from the central region toward the outside is created, and accordingly the radiation of the heat storage unit 100A is effectively accelerated. Then, the solidification gradually progresses from the central region toward the upper and lower regions of the heat storage material 10.

Accordingly, solidification of the heat storage material 10 can be accelerated in the central region thereof, so that the solidification of the entirety of the heat storage material 10 can be accelerated, and the release rate of the latent heat is increased. In addition, the latent heat released from the heat storage material 10 during the solidification thereof can be rapidly transferred to the heat medium by the heat conduction members 20. As a result, radiation rate per unit time of the heat storage unit 100 can be increased, and the radiation performance of the heat storage unit 100 can be increased. The radiation performance of the heat storage unit 100 can be increased even when no heaters or agitators are provided. Therefore, the size of the heat storage unit 100 can be reduced.

The wettability of the heat conduction members 20 can be changed by forming nanostructures on the contact surfaces to be in contact with the heat storage material 10, or subjecting the contact surfaces to surface treatment such plasma treatment or oxidation. For example, the wettability of the contact surfaces of the heat conduction members 20 can be increased by forming nanostructures on the contact surfaces to increase the surface areas thereof. When, for example, the contact surfaces of the heat conduction members 20 are subjected to surface treatment for increasing the surface roughness thereof, the wettability of the contact surfaces may be increased. The region in which the nanostructures are formed or the region in which surface treatment is performed may either be portions of the contact surfaces of the heat transfer members 20 or the entirety of the contact surfaces of the heat conduction members 20.

The nanostructures may be formed on the contact surfaces by, for example, lithography or etching.

In plasma treatment, the contact surfaces of the heat conduction members 20 may be exposed to, for example, oxygen plasma or nitrogen plasma. In the case where the base material of the heat conduction members 20 is a metal, oxidation may be performed by selectively oxidizing the contact surfaces of the heat conduction members 20 with acid gas or acid solution.

The wettability of the heat conduction members 20 may also be changed by coating the contact surfaces thereof with a resin material, such as a fluorocarbon resin or a silicone resin, or by fixing the resin material to the contact surfaces.

The wettability may either be increased or reduced from the original wettability of the base material of the heat conduction members 20 by subjecting the base material of the heat conduction members 20. For example, heat conduction members 20 having a very high wettability may be coated with a fluorocarbon resin in a certain region so that the wettability is reduced in that region.

Figure 4B:
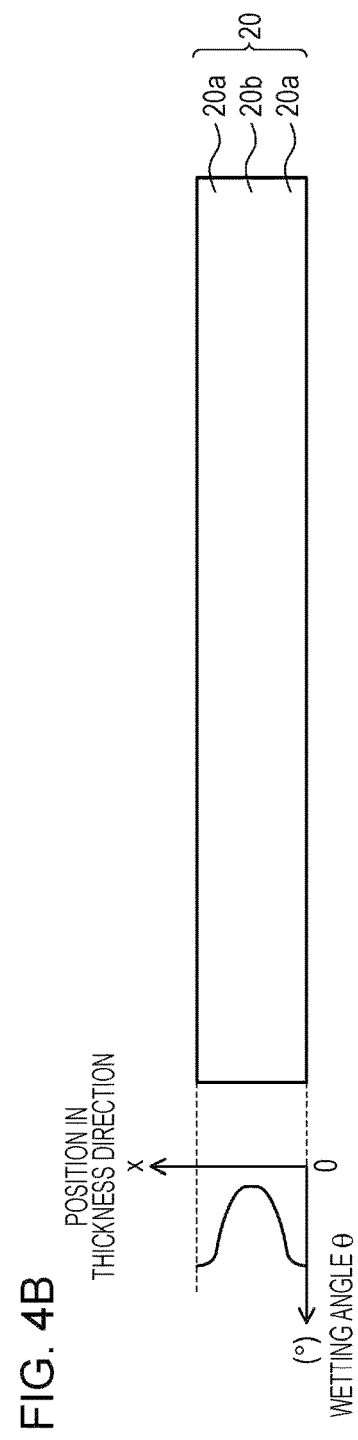
FIG. 4B illustrates a side view of heat conduction members illustrated in FIG. 4A and the relationship between the wetting angle of the heat conduction members and the position in the thickness direction.

In the region in which the wettability varies, as illustrated in FIG. 4B, the wettability may either be varied gradually or stepwise.

An example of a numerical range of the wetting angle will be described below.

[Second Example Regarding Wettability of Heat Conduction Members 20]

A second example regarding the wettability of the heat conduction members 20 will be described with reference to FIGS. 5A and 5B.

As illustrated in FIGS. 5A and 5B, in the second example, the wettability of each of the contact surfaces of the heat conduction members 20, which are in contact with the heat storage material 10, with respect to the heat storage material 10 is higher in a downstream region than in an upstream region in the direction in which the heat medium flows.

The heat medium flowing on the downstream side has a high temperature because the heat medium has received heat from the heat storage material 10 through the heat conduction members 20 on the upstream side. Therefore, the difference in temperature, or temperature gradient, between the heat storage material 10 and the heat medium is smaller on the downstream side than on the upstream side. As a result, the heat storage material 10 cannot easily radiate heat in the downstream region.

Accordingly, in the second example, the wettability of each of the contact surfaces of the heat conduction members 20, which are in contact with the heat storage material 10, is higher in the downstream region than in the upstream region in the direction in which the heat medium flows.

In this case, the generation frequency of the solid-phase nuclei 10a in the heat storage material 10 is higher in regions near the downstream regions of the contact surfaces of the heat conduction members 20 than in regions near the upstream regions of the contact surfaces of the heat conduction members 20. Thus, the solidification of the heat storage material 10 can be accelerated on the downstream side, and the amount of latent heat, released from the heat storage material 10, per unit time can be increased. Therefore, even on the downstream side on which the temperature of the heat medium is high, the temperature difference between the heat medium and the heat storage material 10 can be increased.

As a result, the latent heat released from the downstream region of the heat storage material 10 during the solidification thereof can be rapidly transferred to the heat medium. In other words, radiation rate per unit time of the heat storage unit 100 can be increased. As a result, the radiation performance of the heat storage unit 100 can be increased. The radiation performance of the heat storage unit 100 can be increased even when no heaters or agitators are provided. Therefore, the size of the heat storage unit 100 can be reduced. In the region in which the wettability varies, the wettability may either be varied gradually or stepwise.

[Third Example Regarding Wettability of Heat Conduction Members 20]

A third example regarding the wettability of the heat conduction members 20 will be described with reference to FIGS. 6A and 6B.

Figure 6A:
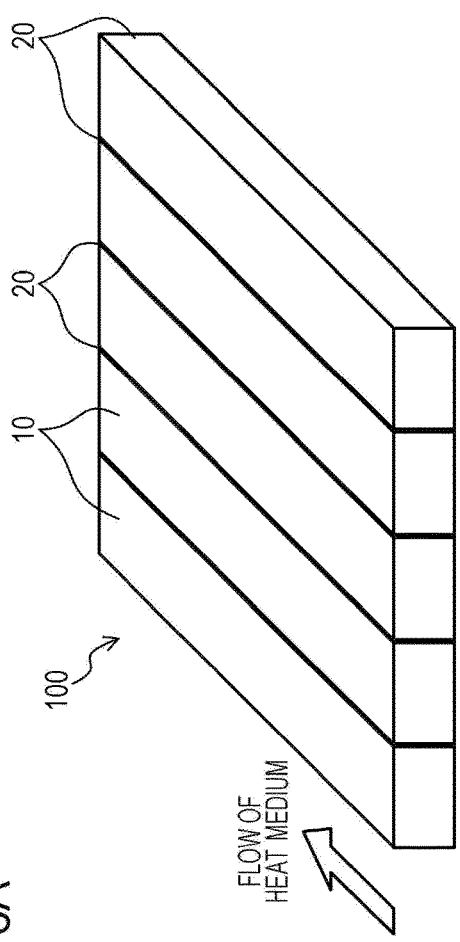
FIG. 6A is a schematic perspective view illustrating the relationship between the heat storage unit according to the first embodiment and the flow of the heat medium.
Figure 6B:
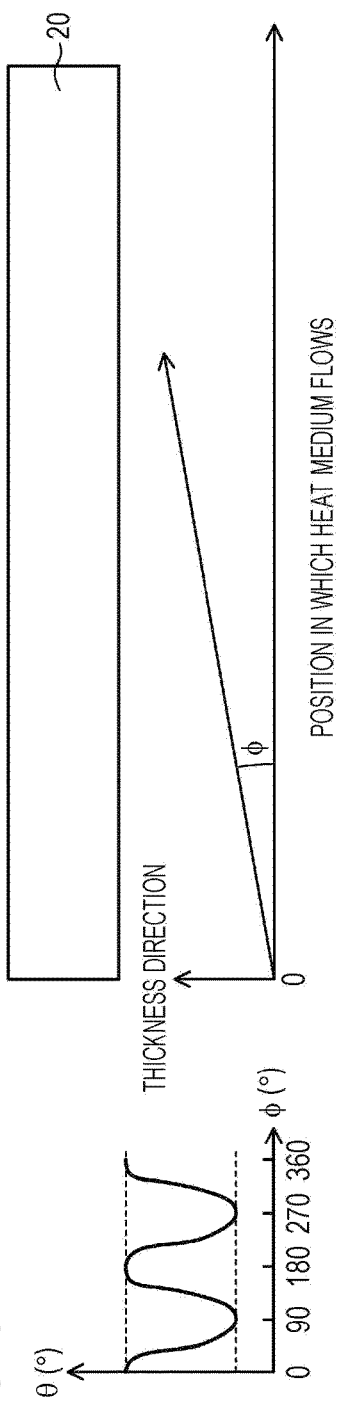
FIG. 6B illustrates a side view of the heat conduction members illustrated in FIG. 6A, an angle $\phi$ between the direction in which the heat medium flows and a certain direction, and the relationship between the wetting angle of the heat conduction members and the angle $\phi$.

As illustrated in FIGS. 6A and 6B, in the third example, the wettability of each of the contact surfaces of the heat conduction members 20, which are in contact with the heat storage material 10, with respect to the heat storage material 10 is higher in the thickness direction than in the direction in which the heat medium flows.

For example, in directions at angles $\phi$ (°) that are even multiples of 90° (i.e., 0°, 180°) with respect to the direction in which the heat medium flows, the wetting angle $\theta$ (°), which is an index of wettability, is large, that is, the wettability is low. In directions at angles $\phi$ (°) that are odd multiples of 90° (i.e., 90°, 270°), the wetting angle is small, that is, the wettability is high.

In this case, the wettability of the heat conduction members 20 in regions in which the heat conduction members 20 are in contact with the heat storage material 10 is high in the direction perpendicular to the direction in which the heat medium flows, and is low in the direction in which the heat medium flows. For example, the wettability of the contact surfaces of the heat conduction members 20, which are in contact with the heat storage material 10, is high in the thickness direction of the heat conduction members 20, and is low in the longitudinal direction of the heat conduction members 20. Therefore, the generation frequency of the solid-phase nuclei 10a on the contact surfaces of the heat conduction members 20 is higher in the thickness direction than in the longitudinal direction. As a result, the rate of solidification in the thickness direction can be increased, and thereby the solidification can be accelerated over the entire region. Thus, the release rate of the latent heat can be increased.

Therefore, the latent heat released from the central region of the heat storage material 10 during the solidification thereof can be rapidly transferred to the heat medium. In other words, radiation rate per unit time of the heat storage unit 100 can be increased. As a result, the radiation performance of the heat storage unit 100 can be increased. The radiation performance of the heat storage unit 100 can be increased even when no heaters or agitators are provided. Therefore, the size of the heat storage unit 100 can be reduced.

Also in the second and third examples, the wettability of the contact surfaces of the heat conduction members 20 can be changed by methods described in the first example. In the region in which the wettability varies, the wettability may either be varied gradually or stepwise.

The wettability of the heat conduction members 20 may be the combination of the first, second, and third examples.

For example, each heat conduction member 20 may have a wettability that varies depending on the position in the thickness direction, as described in the first example, and also varies depending on the position in the direction in which the heat medium flows, as described in the second example. Alternatively, each heat conduction member 20 may have a wettability that varies depending on the position in the thickness direction, as described in the first example, and also varies depending on the direction at each position on the heat conduction member 20, as described in the third example.

[Example of Numerical Range of Wetting Angle]

Figure 7:
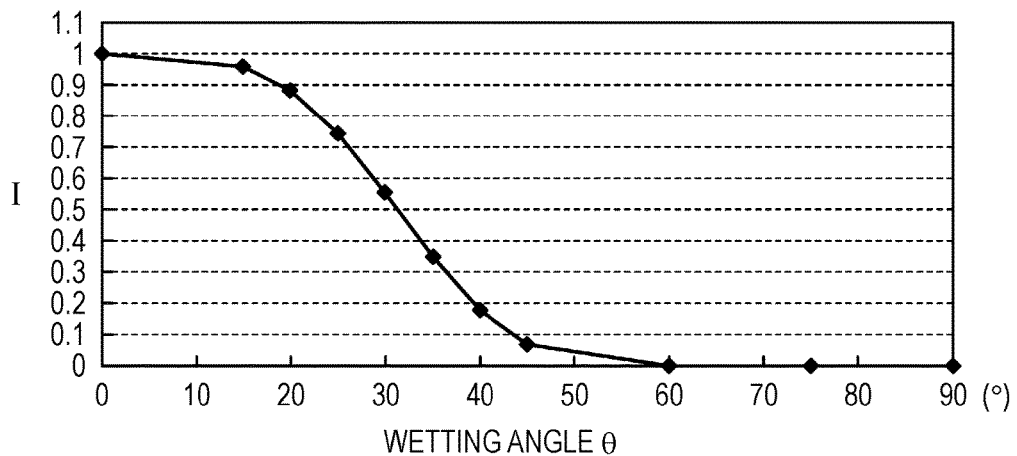
FIG. 7 is a graph showing the relationship between the generation frequency of solid-phase nuclei in the heat storage material in regions near contact surfaces of the heat conduction members and the wetting angle of heat conduction members.

FIG. 7 illustrates the function representing the dependency of the generation frequency of the nuclei on the wetting angle θ and a graph of the function. The heat storage material 10 changes from a liquid phase to a solid phase by generating solid-phase nuclei in regions thereof near the heat conduction members 20. The function f(θ) is one of the parameters that determine the generation frequency I, which is the generation probability, of the solid-phase nuclei. The generation frequency I of the nuclei decreases as the value of f(θ) increases.

Therefore, to set an appropriate wettability, the wetting angle θ may be set to a value in the range of 0° or more and 25° or less. In such a case, the generation frequency I of the nuclei exceeds 0.7.

Modification of First Embodiment

Figure 8:
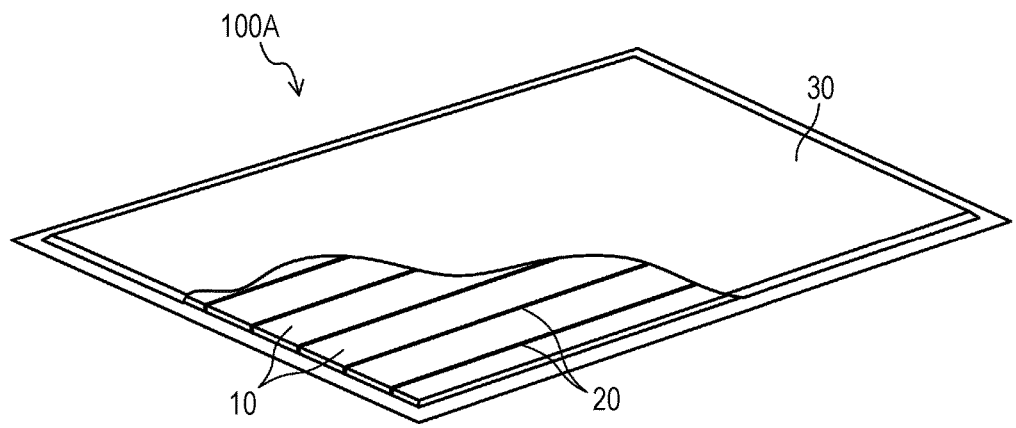
FIG. 8 is a perspective view of a heat storage unit according to a modification of the first embodiment.

FIG. 8 illustrates a heat storage unit 100A according to a modification of the heat storage unit 100. The heat storage unit 100A is obtained by arranging sealing members 30 on the top and bottom surfaces of the heat storage unit 100 to seal the heat storage unit 100.

Since the heat storage unit 100A comprises the sealing members 30, the viscosity of the heat storage material 10 can be reduced and the heat storage material 10 can be easily handled, for example.

The wettability of contact surfaces of the sealing members 30 that are in contact with the heat storage material 10 may be higher in a downstream region than in an upstream region in the direction in which the heat medium flows.

The heat medium flowing on the downstream side has a high temperature because the heat medium has received heat from the heat storage material 10 through the sealing members 30 on the upstream side. Therefore, the difference in temperature, or temperature gradient, between the heat storage material 10 and the heat medium is smaller on the downstream side than on the upstream side. As a result, the heat storage material 10 cannot easily radiate heat in the downstream region.

Accordingly, similar to the heat conduction members 20 according to the second example, the wettability of each of the contact surfaces of the sealing members 30, which are in contact with the heat storage material 10, may be higher in the downstream region than in the upstream region in the direction in which the heat medium flows.

In this case, the generation frequency of the solid-phase nuclei 10a in the heat storage material 10 is higher in regions near the downstream regions of the contact surfaces of the sealing members 30 than in regions near the upstream regions of the contact surfaces of the sealing members 30.

Therefore, the latent heat released from the downstream region of the heat storage material 10 during the solidification thereof can be rapidly transferred to the heat medium. In other words, radiation rate per unit time of the heat storage unit 100A can be increased. As a result, the radiation performance of the heat storage unit 100A can be increased. The radiation performance of the heat storage unit 100A can be increased even when no heaters or agitators are provided. Therefore, the size of the heat storage unit 100A can be reduced.

Second Embodiment

A heat storage unit 100B according to a second embodiment will be described with reference to FIG. 9.

Referring to FIG. 9, the heat storage unit 100B according to the present embodiment includes a plurality of partitioning members 21. The partitioning members 21 are arranged in a direction that crosses the heat conduction members 20, that is, in a direction that crosses the direction in which a heat medium flows. The partitioning members 21 may have a function of positioning the heat conduction members 20 and a function of transferring heat. The partitioning members 21 may have openings 21a. In the case, when solidification, or crystallization, starts from an upstream region of the heat storage material 10, crystallization that progresses from the upstream region to a downstream region may be prevented from being obstructed. As a result, solidification in the downstream region can be accelerated, and radiation rate per unit time of the heat storage unit 100B can be increased.

The partitioning members 21 may be made of a material having a thermal conductivity higher than of the heat storage material 10. For example, the above-described metal may be used as the partition members 21. The material of the partitioning members 21 may either be the same as or different from the material of the heat conduction members 20.

The shape of the partitioning members 21 is not limited to the plate-like shape as illustrated in FIG. 9, and the partitioning members 21 may instead be wire-shaped.

Thus, according to the second embodiment, the latent heat released from the heat storage material 10 during the solidification thereof can be rapidly transferred to the heat medium by the heat conduction members 20 and the partitioning members 21. In other words, radiation rate per unit time of the heat storage unit 100B can be increased. As a result, while the size of the heat storage unit 100B can be reduced, the radiation performance thereof can be increased.

The contact surfaces of the heat conduction members 20, which are in contact with the heat storage material 10, may be configured such that the wettability thereof is selectively increased, as illustrated in FIGS. 4 to 6. In such a case, the generation frequency of the solid-phase nuclei 10a in the heat storage material 10 is increased near the regions of the heat conduction members 20 in which the wettability is increased and the regions of the partitioning members 21 in which the wettability is increased. As a result, solidification of the heat storage material 10 can be accelerated and thereby the radiation performance of the heat storage unit 100B can be further increased.

Modification of Second Embodiment

A modification of the present embodiment will be described with reference to FIG. 10.

As illustrated in FIG. 10, in a heat storage unit 100C according to the present modification, the gap between the partitioning members 21 decreases from the upstream side toward the downstream side in the direction in which the heat medium flows. In other words, sections into which the heat storage material 10 is divided by the partitioning members 21 are smaller at the downstream side than at the upstream side in the direction in which the heat medium flows.

In this case, the latent heat released from the downstream region of the heat storage material 10 during the solidification thereof can be rapidly transferred to the heat medium. In other words, radiation rate per unit time of the heat storage unit 100C can be increased. As a result, while the size of the heat storage unit 100C can be reduced, the radiation performance thereof can be increased.

The contact surfaces of the heat conduction members 20, which are in contact with the heat storage material 10, may be configured such that the wettability thereof is selectively increased, as illustrated in FIGS. 4 and 6. In such a case, the generation frequency of the solid-phase nuclei 10a in the heat storage material 10 is increased near the regions of the heat conduction members 20 in which the wettability is increased and the regions of the partitioning members 21 in which the wettability is increased. As a result, solidification of the heat storage material 10 can be accelerated and the radiation performance of the heat storage unit 100C can be further increased.

The top and bottom surfaces of the heat storage unit 100B according to the second embodiment and the heat storage unit 100C according to the modification may be sealed with sealing members 30, as in the structure illustrated in FIG. 8.

Third Embodiment

A heat storage unit 100D according to a third embodiment will be described with reference to FIG. 11.

As illustrated in FIG. 11, the heat storage unit 100D according to the present embodiment includes a plurality of strip-shaped heat conduction members 22. Longitudinal side surfaces of the adjacent heat conduction members 22 are fixed to each other. A heat storage material 10 is sealed in the heat conduction members 22. The heat conduction members 22 may be fixed to each other by a fixing method with which high thermal conductivity may be ensured, for example, by adhesion using a thermally conductive adhesive or by welding.

Figure 12A:
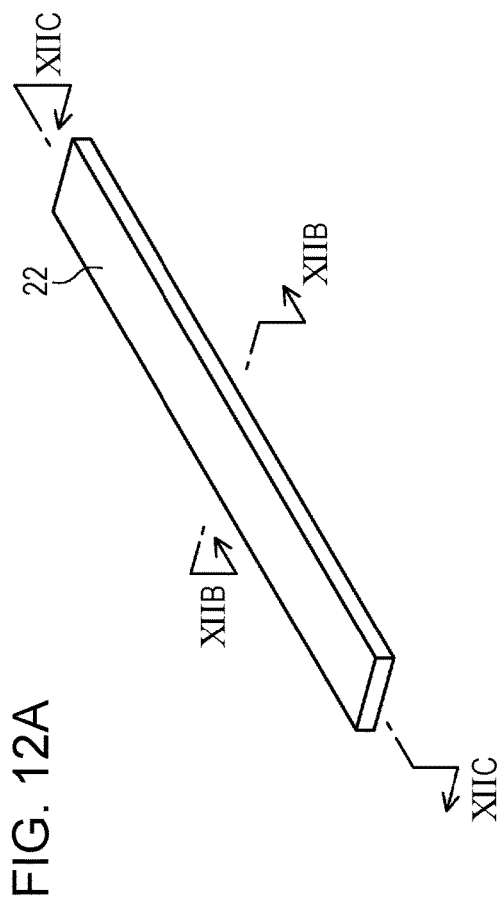
FIG. 12A is a perspective view of a sub-unit included in the heat storage unit according to the third embodiment.
Figure 12C:
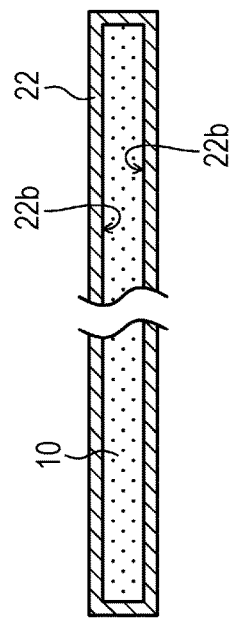
FIG. 12C is a sectional view of FIG. 12A taken along line XIIC-XIIC.
Figure 12B:
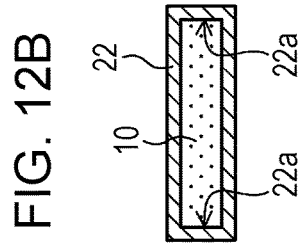
FIG. 12B is a sectional view of FIG. 12A taken along line XIIB-XIIB.

FIG. 12A is a perspective view of a single heat conduction member 22 that constitutes a component of a sub-unit. FIG. 12B is a sectional view taken along the width direction, direction perpendicular to the longitudinal direction, and FIG. 12C is a sectional view taken along the longitudinal direction. As illustrated in FIGS. 12B and 12C, the heat storage material 10 is sealed in the heat conduction member 22.

In other words, each heat conduction member 22 is used as a sealing member that seals the heat storage material 10. Each heat conduction member 22 and the heat storage material 10 form a sub-unit. The sub-units are arranged next to each other and integrated together to form the heat storage unit 100D. The heat storage unit 100D is immersed in, for example, a heat medium. Each sub-unit of the heat storage unit 100D is arranged so that the length thereof in the direction in which the heat medium flows is greater than a length thereof in a direction perpendicular to the direction in which the heat medium flows.

An example of a method for manufacturing a single heat conduction member 22 illustrated in FIG. 12A in which the heat storage material 10 is sealed will be described. First, a strip-shaped hollow heat conduction member 22 is prepared, and one end of the heat conduction member 22 is sealed with a material which is the same as or equivalent to the material of the heat conduction member 22. In the case where the heat conduction member 22 is made of a metal, one end of the heat conduction member 22 may be sealed by crimping. Then, the heat storage material 10 in a liquid state is injected into the heat conduction member 22 from the other end of the heat conduction member 22, which is open. Then, the open end of the heat conduction member 22 is sealed in a similar manner.

Inner side surfaces 22a of the heat conduction member 22 illustrated in FIG. 12B serve as contact surfaces that are in contact with the heat storage material 10. The inner side surfaces 22a of the heat conduction member 22 may be configured such that the wettability thereof is selectively increased, as illustrated in FIGS. 4 to 6. Inner upper and lower surfaces 22b of the heat conduction member 22 illustrated in FIG. 12C also serve as contact surfaces that are in contact with the heat storage material 10. The wettability of the inner upper and lower surfaces 22b of the heat conduction member 22 with respect to the heat storage material 10 may be higher in a downstream end region than in an upstream end region in the direction in which the heat medium flows.

According to the third embodiment, the strip-shaped heat conduction members 22, in which the heat storage material 10 is sealed, are evenly arranged. Therefore, the generation frequency of the solid-phase nuclei 10a in the heat storage material 10 can be increased in regions near the heat conduction members 22. Therefore, heat storage material 10 solidifies over the entire region thereof. In addition, the latent heat released from the heat storage material 10 during the solidification thereof can be rapidly transferred to the heat medium by the heat conduction members 22. In other words, radiation rate per unit time of the heat storage unit 100D can be increased. As a result, while the size of the heat storage unit 100D can be reduced, the radiation performance thereof can be increased.

With the heat storage unit 100D according to the present embodiment, the strip-shaped heat conduction members 22, in which the heat storage material 10 is sealed, may be connected to each other by successively fixing the heat conduction members 22 such that the heat conduction members 22 are adjacent to each other in the width direction thereof. Therefore, the thermal capacity of a single unit can be easily set in accordance with the application thereof.

Similar to the second embodiment illustrated in FIG. 9, each sub-unit may include at least one partitioning heat conduction member 21, and each partitioning heat conduction member 21 may have an opening 21a.

In the case where a plurality of partitioning members 21 are provided in each sub-unit, similar to the modification of the second embodiment illustrated in FIG. 10, the partitioning members 21 may be arranged such that the gap therebetween decreases from the upstream side toward the downstream side in the direction in which the heat medium flows.

Fourth Embodiment

A heat storage module 200 according to a fourth embodiment will be described with reference to FIG. 13.

Figure 13:
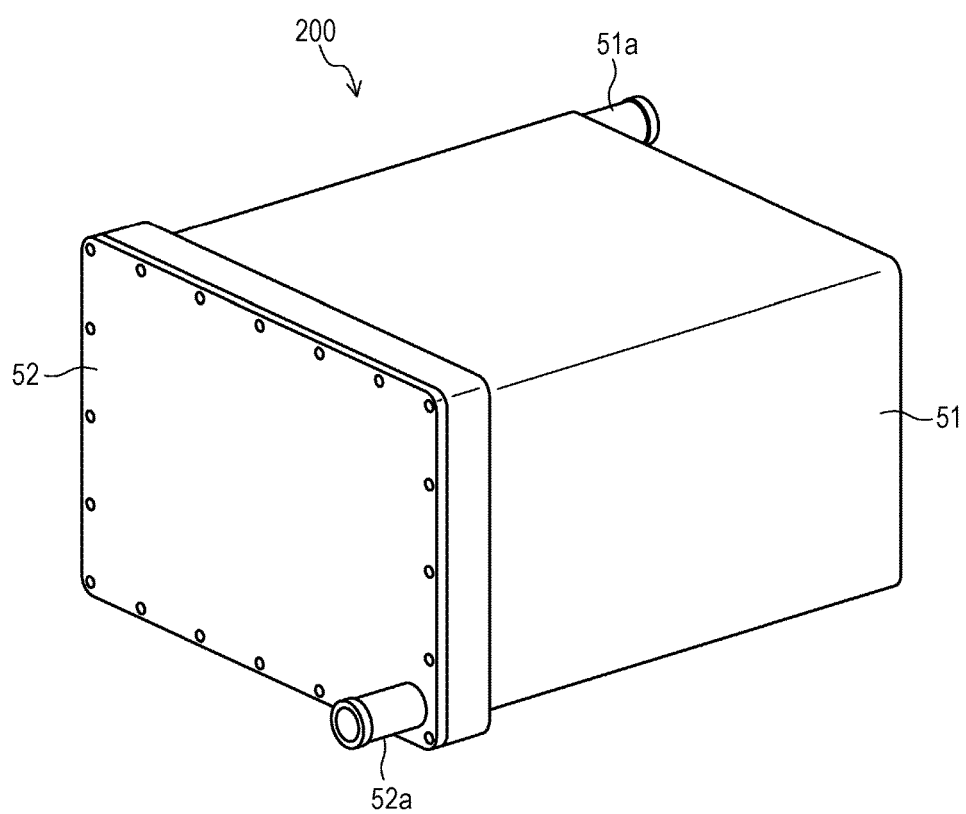
FIG. 13 is a perspective view of a heat storage module according to a fourth embodiment.

Referring to FIG. 13, the heat storage module 200 according to the present embodiment includes, for example, a plurality of heat storage units 100A stacked with spaces therebetween in the vertical direction, a rectangular-parallelepiped-shaped housing 51 that contains the heat storage units 100A, and a lid 52 that is detachably attached to the housing 51 so as to seal the housing 51.

An inlet 52a for a heat medium is located in the lid 52 at, for example, the lower right corner. An outlet 51a for the heat medium is located in a surface of the housing 51 that faces the lid 52 at a position diagonal to the position of the inlet 52a.

The inlet 52a is not necessarily located in the lid 52, and may instead be located in a side surface of the housing 51 at a position distant from the outlet 51a.

Alternatively, the inlet 52a may be located in the housing 51 while the outlet 51a is located in the lid 52 or in a portion of the housing 51 near the lid 52.

The housing 51 and the lid 52 may be formed of a material having a low thermal conductivity, such as a resin material, so that the housing 51 and the lid 52 do not take heat from the heat medium. In the case where the housing 51 and the lid 52 are formed of a material having a high thermal conductivity, such as a metal, a heat insulating material may be provided on at least the inner wall surfaces of the housing 51 and the lid 52 or the outer wall surfaces of the housing 51 and the lid 52. Thus, the heat retaining property of the housing 51 and the lid 52 can be increased.

Figure 14:
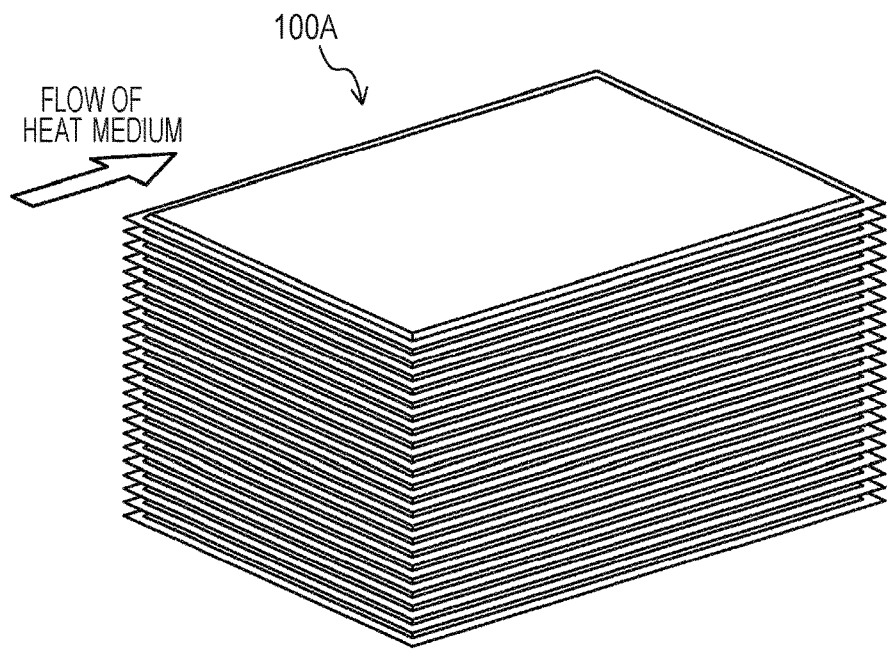
FIG. 14 is a perspective view of a heat storage unit included in the heat storage module according to the fourth embodiment.

FIG. 14 illustrates an example of the structure of the heat storage units 100A. Referring to FIG. 14, a predetermined number of heat storage units 100A are stacked in the vertical direction with spacers (not shown) therebetween.

Figure 15:
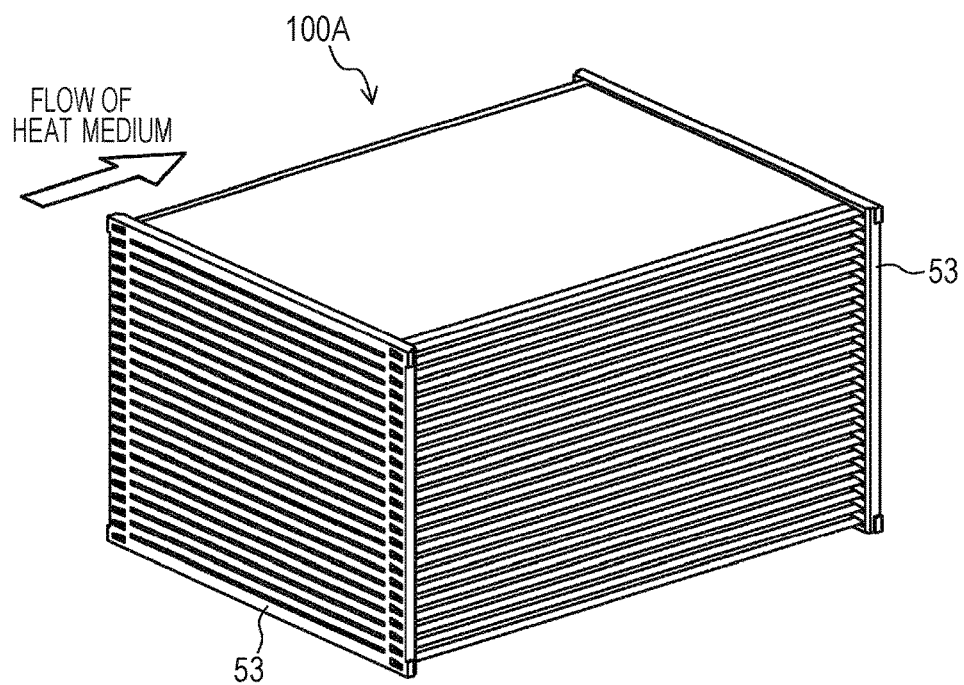
FIG. 15 is a perspective view of a heat storage unit included in the heat storage module according to a modification of the fourth embodiment.

FIG. 15 illustrates another example of the structure of the heat storage units 100A. Referring to FIG. 15, a predetermined number of heat storage units 100A are retained by a retainer 53 in such a manner that the heat storage units 100A are stacked in the vertical direction with spaces therebetween. The retainer 53 may be made of a metal or a resin.

The heat storage units included in the heat storage module 200 according to the present embodiment are not limited to the heat storage units 100A, and may instead be the heat storage units 100, 1008, 100C, or 100D.

Applications

An application of the heat storage module according to the fourth embodiment will now be described with reference to FIG. 16.

Figure 16:
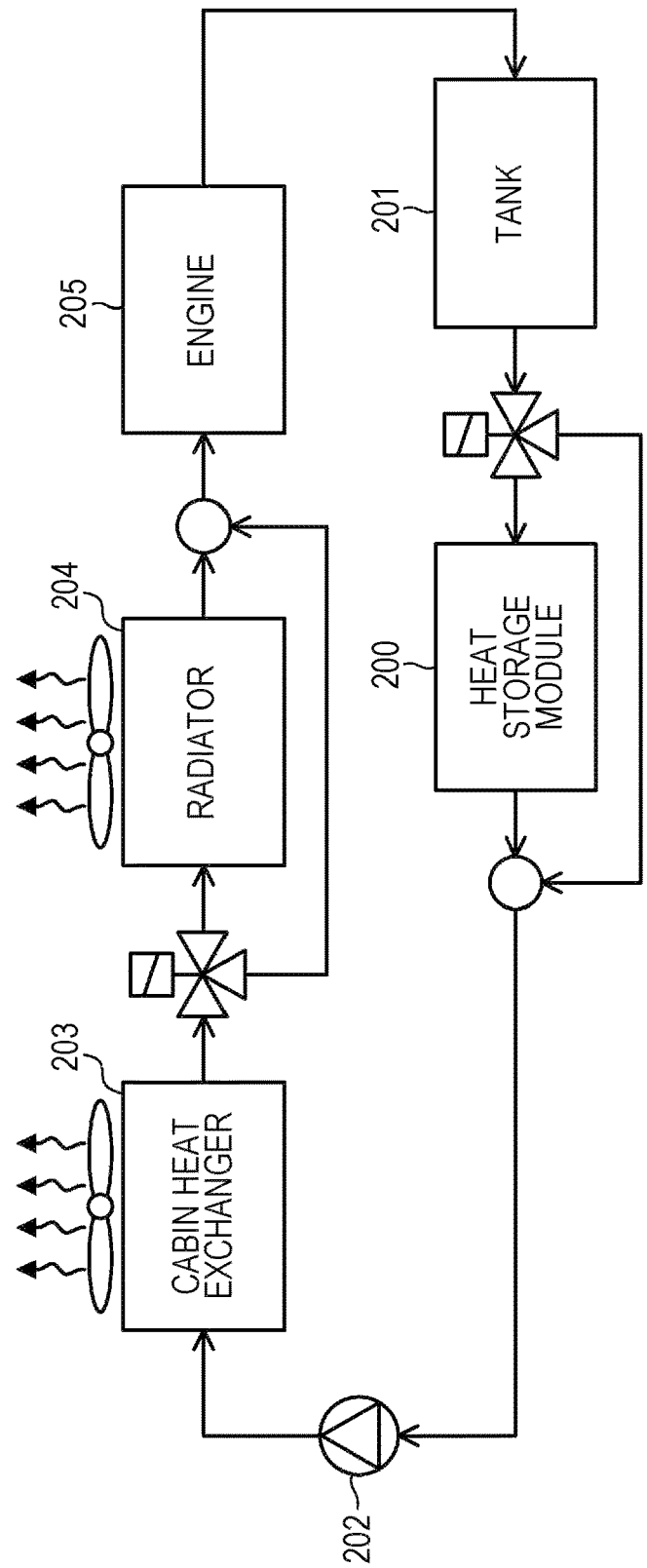
FIG. 16 is a block diagram illustrating an application of the heat storage module according to the fourth embodiment.

As illustrated in FIG. 16, in this application, the heat storage module 200 according to the fourth embodiment is used to achieve quick heating or cooling in a vehicle in which an engine is mounted. In this case, the heat medium is water or antifreeze (i.e., aqueous solution of ethylene glycol).

An electric pump 202, for example, causes the heat medium (hereinafter referred to as a coolant) contained in a tank 201 to flow into a cabin heat exchanger 203 after passing through or bypassing the heat storage module 200. The coolant that has flowed out of the cabin heat exchanger 203 flows into an outer region of the engine 205 after passing through or bypassing a radiator 204, and then returns to the tank 201.

When the engine 205 is started from the state in which the temperature thereof is substantially the same as the outside temperature, the coolant contained in the tank 201 is circulated through the heat storage module 200, the cabin heat exchanger 203, and the engine 205 by the electric pump 202. The coolant that has been heated by the engine 205 transfers heat to heat storage material 10 included in the heat storage module 200. Owing to the increase in temperature of the cooling water, many solid-phase nuclei 10a are generated in the heat storage material 10 in the supercooled liquid state, and then the heat storage material 10 is solidified. As a result, the heat storage material 10 rapidly releases the latent heat to the coolant, so that the temperature of the coolant approaches a predetermined temperature. The heat storage material 10 that has released the latent heat then returns to the liquid state after the coolant heated by the engine 205 exceeds the melting point of the heat storage material 10, since the heat storage material 10 is heated by the coolant.

In this application, a trigger for generating the solid-phase nuclei 10a in the heat storage material 10 is a rapid temperature increase in the coolant after the start of the engine 205. However, the present disclosure is not limited to this, and a mechanical vibration at the start of the engine 205 may instead be used as a trigger.

The heat storage module 200 may further include, as an auxiliary device for generating the nuclei, a nucleus generating device such as a vibration generating device, an ultrasonic irradiation device, or a voltage applying device.

In the case where the above-mentioned nucleus generating device is used, the heat storage module 200 according to the present embodiment may be mounted in a vehicle in which no engine 205 is mounted, such as an electric vehicle.

The heat storage unit and the heat storage module including the heat storage unit according to the present disclosure may be applied to, for example, a vehicle or the like.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A heat storage device for use by being immersed in a heat medium that flows from upstream to downstream, the heat storage device comprising:
    a heat storage material that absorbs or releases latent heat with a phase transition between a liquid phase and a solid phase; and
    a heat conduction member that includes a contact surface contacting the heat storage material, the heat conduction member having a thermal conductivity higher than a thermal conductivity of the heat storage material, the contact surface including an upstream region and a downstream region that is located at a downstream side of the upstream region in a flowing direction of the heat medium, a wettability of the contact surface with respect to the heat storage material being higher in the downstream region than in the upstream region,
    wherein the contact surface includes a central region and a pair of end regions opposing each other across the central region in a short-length direction of the contact surface, and
    the wettability of the contact surface with respect to the heat storage material is further higher in the central region than in the pair of end regions.

2. The heat storage device according to claim 1, wherein a length of the heat conduction member in the flowing direction is greater than a length of the heat conduction member in a direction perpendicular to the flowing direction.

3. The heat storage device according to claim 1, wherein the heat storage material is plate-shaped, and
    the heat conduction member extends perpendicularly to a principal plane of the heat storage material.

4. The heat storage device according to claim 1, further comprising a sealing member that seals the heat storage material.

5. The heat storage device according to claim 4, wherein the heat conduction member is fixed in the sealing member.

6. The heat storage device according to claim 4, wherein the heat conduction member includes a pair of principle surfaces which oppose to each other and a side surface across which the pair of principle surfaces are connected with each other,
    each of the pair of principle surfaces includes the contact surface, and
    at least part of the side surface is thermally coupled with the sealing member.

7. The heat storage device according to claim 4, wherein the sealing member is integrated with the heat conduction member.

8. The heat storage device according to claim 4, wherein the sealing member contains a metal, graphite, or a ceramic material.

9. The heat storage device according to claim 1, wherein the wettability of the contact surface with respect to the heat storage material is further higher in a direction perpendicular to the flowing direction than in the flowing direction.

10. The heat storage device according to claim 1, wherein the heat conduction member contains a metal, graphite, or a ceramic material.

11. The heat storage device according to claim 1, wherein at least a part of the contact surface includes nanostructures, oxidized part, nitrided part, resin part, or coated part.

12. A heat storage module comprising:
    a heat storage device comprising:
        a heat storage material that absorbs or releases latent heat with a phase transition between a liquid phase and a solid phase; and
        a heat conduction member that includes a contact surface contacting the heat storage material, the heat conduction member having a thermal conductivity higher than a thermal conductivity of the heat storage material, the contact surface including an upstream region and a downstream region that is located at a downstream side of the upstream region in a flowing direction of a heat medium, a wettability of the contact surface with respect to the heat storage material being higher in the downstream region than in the upstream region,
        wherein the contact surface includes a central region and a pair of end regions opposing each other across the central region in a short-length direction of the contact surface, and
        the wettability of the contact surface with respect to the heat storage material is further higher in the central region than in the pair of end regions; and
    a housing that contains the heat storage material and the heat conduction member, the housing including an inlet, through which the heat medium flows into the housing, and an outlet, through which the heat medium flows out of the housing.

13. The heat storage module according to claim 12, further comprising:
    a plurality of heat storage devices that are stacked with space therebetween in the housing, one of the plurality of heat storage devices including the heat storage material and the heat conduction member.

14. A heat storage device for use by being immersed in a heat medium that flows from upstream to downstream, the heat storage device comprising:
    a heat storage material that absorbs or releases latent heat with a phase transition between a liquid phase and a solid phase; and
    a heat conduction member that includes a contact surface contacting the heat storage material, the heat conduction member having a thermal conductivity higher than a thermal conductivity of the heat storage material, the contact surface including an upstream region and a downstream region that is located at a downstream side of the upstream region in a flowing direction of the heat medium, a wettability of the contact surface with respect to the heat storage material being higher in the downstream region than in the upstream region,
    wherein the wettability of the contact surface with respect to the heat storage material is further higher in a direction perpendicular to the flowing direction than in the flowing direction.

15. The heat storage device according to claim 14, wherein a length of the heat conduction member in the flowing direction is greater than a length of the heat conduction member in a direction perpendicular to the flowing direction.

16. The heat storage device according to claim 14, wherein the heat storage material is plate-shaped, and
    the heat conduction member extends perpendicularly to a principal plane of the heat storage material.

17. The heat storage device according to claim 14, further comprising a sealing member that seals the heat storage material.

18. The heat storage device according to claim 14, wherein the heat conduction member contains a metal, graphite, or a ceramic material.

19. The heat storage device according to claim 14, wherein at least a part of the contact surface includes nanostructures, oxidized part, nitrided part, resin part, or coated part.

20. A heat storage module comprising:
    a heat storage device comprising:
        a heat storage material that absorbs or releases latent heat with a phase transition between a liquid phase and a solid phase; and
        a heat conduction member that includes a contact surface contacting the heat storage material, the heat conduction member having a thermal conductivity higher than a thermal conductivity of the heat storage material, the contact surface including an upstream region and a downstream region that is located at a downstream side of the upstream region in a flowing direction of a heat medium, a wettability of the contact surface with respect to the heat storage material being higher in the downstream region than in the upstream region,
        wherein the wettability of the contact surface with respect to the heat storage material is further higher in a direction perpendicular to the flowing direction than in the flowing direction; and
    a housing that contains the heat storage material and the heat conduction member, the housing including an inlet, through which the heat medium flows into the housing, and an outlet, through which the heat medium flows out of the housing.

* * * * *